US006824186B2

United States Patent
Brown

(10) Patent No.: US 6,824,186 B2
(45) Date of Patent: Nov. 30, 2004

(54) CONVENIENT TAILGATE SEAT

(76) Inventor: Robert Brown, 5812 Sweeney Cir., #101-A, Austin, TX (US) 78729

( * ) Notice: Subject to any disclaimer, the term of this patent is extended or adjusted under 35 U.S.C. 154(b) by 0 days.

(21) Appl. No.: 10/283,617

(22) Filed: Oct. 30, 2002

(65) Prior Publication Data

US 2004/0084927 A1 May 6, 2004

(51) Int. Cl.$^7$ ................................................. B60N 2/20
(52) U.S. Cl. ............................ 296/65.16; 296/65.01; 297/354.1
(58) Field of Search ..................... 296/65.01, 65.05, 296/65.09, 65.16, 51, 57.1, 63, 64, 65.02, 65.03, 67; 297/16.1, 34, 114, 254, 354.1, 350

(56) References Cited

U.S. PATENT DOCUMENTS

| | | | | |
|---|---|---|---|---|
| 4,679,840 A | * | 7/1987 | Fry et al. | 296/64 |
| 5,078,443 A | * | 1/1992 | Austin | 296/63 |
| 5,215,346 A | * | 6/1993 | Reitzloff et al. | 296/51 |
| 5,368,354 A | * | 11/1994 | Martin | 296/64 |
| 5,516,179 A | * | 5/1996 | Tidwell | 296/63 |
| 5,516,193 A | * | 5/1996 | Simpson | 297/252 |
| 5,533,774 A | * | 7/1996 | Cavanaugh | 296/66 |
| 5,816,646 A | * | 10/1998 | Combest | 296/163 |
| 5,975,610 A | * | 11/1999 | Tracy | 296/63 |
| 6,116,676 A | * | 9/2000 | Edwards | 296/64 |
| 6,203,108 B1 | * | 3/2001 | Mattison, Jr. | 297/352 |
| 6,227,594 B1 | * | 5/2001 | Pommeret | 296/57.1 |
| 6,364,391 B1 | * | 4/2002 | Everett | 296/51 |

* cited by examiner

Primary Examiner—D. Glenn Dayoan
Assistant Examiner—Greg Blankenship
(74) Attorney, Agent, or Firm—H. Dale Langley, Jr. P.C.

(57) ABSTRACT

A tailgate seat system for use with a pickup truck includes a back, a seat, and a hinge connecting the seat to the back. The hinge permits the back to freely pivot with respect to the seat, including to form an L-shaped position and also a folded U-shaped position. The tailgate seat system also includes a substantially rigidly supported pole extending along the back to maintain the back in fixed L-shaped or U-shaped position with respect to the seat. The back and the seat each include a rigid panel topped with padding. The back and seat can be upholstered or otherwise treated for comfortable use in seating. The seat can sit atop a tailgate, and the back can extend upright from the seat. The tailgate seat system is conveniently stowable in minimal space of a pickup bed. Additionally, the back of the seat can serve as a display, such as for a design, ad, or team logo.

12 Claims, 4 Drawing Sheets

CONVENIENT TAILGATE SEAT

BACKGROUND OF THE INVENTION

The present invention generally relates to truck accessories and seating and, more particularly, relates to a removable, compact, and stowable tailgate seat and bed accessory for pickup trucks and the like.

Pickup trucks are convenient for many uses. The bed of a pickup truck provides capacity for stowing and transporting large, messy, noxious, and other items. Moreover, persons and things can be located in the bed. Although certain locales may forbid children or other persons from riding in a pickup bed while the pickup is traveling on regulated roads, people, including children, enjoy sitting in the pickup bed in numerous instances.

As an example, it has become popular to use a pickup tailgate as a make-shift seat and hold so-called "tailgate" parties before football games and other events. Moreover, a pickup tailgate is popular for use as such a make-shift seat when watching parades, outdoor movies, concerts, sports and otherwise. In the past, a pickup tailgate has generally been used as this make-shift seat, without employment of any special equipment or features. In the few instances in which special equipment or features have been used, the equipment and features of the tailgate seat arrangement have proven cumbersome, unwieldy, inconvenient, and otherwise impractical.

As is well known, a pickup tailgate is typically formed of metal and is hard, uncomfortable, and lacking a back support as a seat. Nonetheless, pickup tailgates have often been employed for seating. Conventionally, those seated on a pickup tailgate have either merely borne the lack of comfort or have ad hoc employed blankets, lawn chairs, cushions, and so forth to cushion the tailgate.

The present invention solves problems of past devices and systems, and presents significant new and improved features and uses.

BRIEF DESCRIPTION OF THE DRAWINGS

The present invention is illustrated by way of example and not limitation in the accompanying figures, in which like references indicate similar elements, and in which.

DETAILED DESCRIPTION OF PREFERRED EMBODIMENTS

Figure 1:
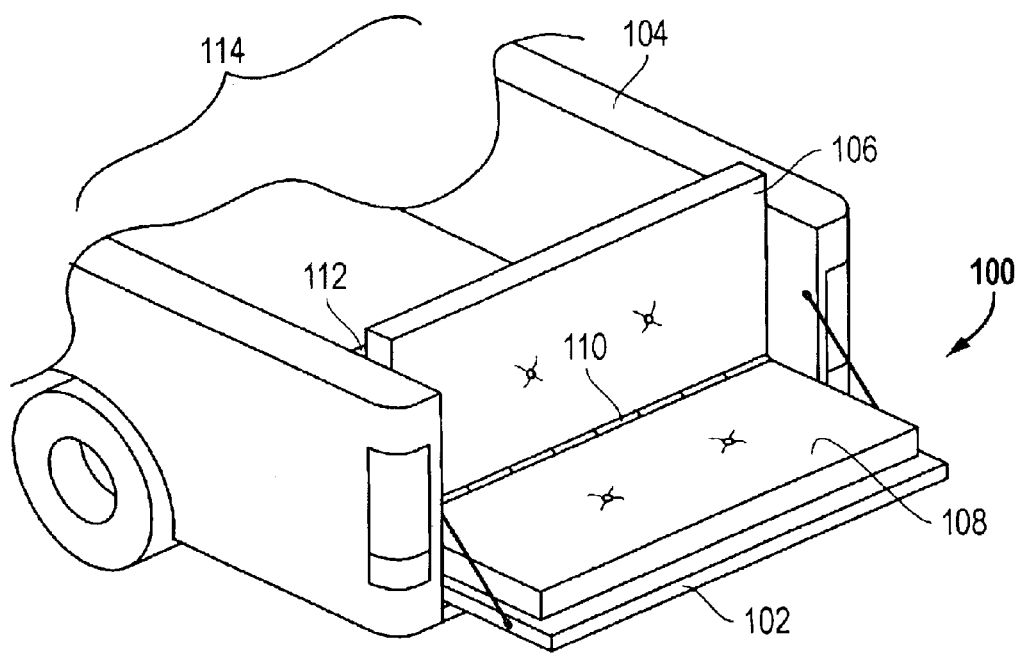
FIG. 1 illustrates a perspective view of a tailgate seat assembly, in place at a tailgate of a truck bed shown in partial view, according to certain embodiments of the invention.

Referring to FIG. 1, a system 100 is located at a tailgate 102 of a pickup truck 104. The system 100 includes a back 106 and a seat 108. The back 106 and the seat 108 are hingedly connected by a hinge 110 of the system 100. The system 100 also includes a pole 112 for supporting the back 106. The pole 112 is attached across a bed 114 of the pickup truck 104, in a manner to extend along the back 106 of the system 100 for support of the back 106 in upright location to the bed 114. The seat 108 is located atop the tailgate 102 of the pickup truck 104, with the tailgate 102 in its open or down position. In this manner, the system 100 provides the seat 108, the back 106 and the pole 112 forming a tailgate seat with bottom and back support.

Figure 2:
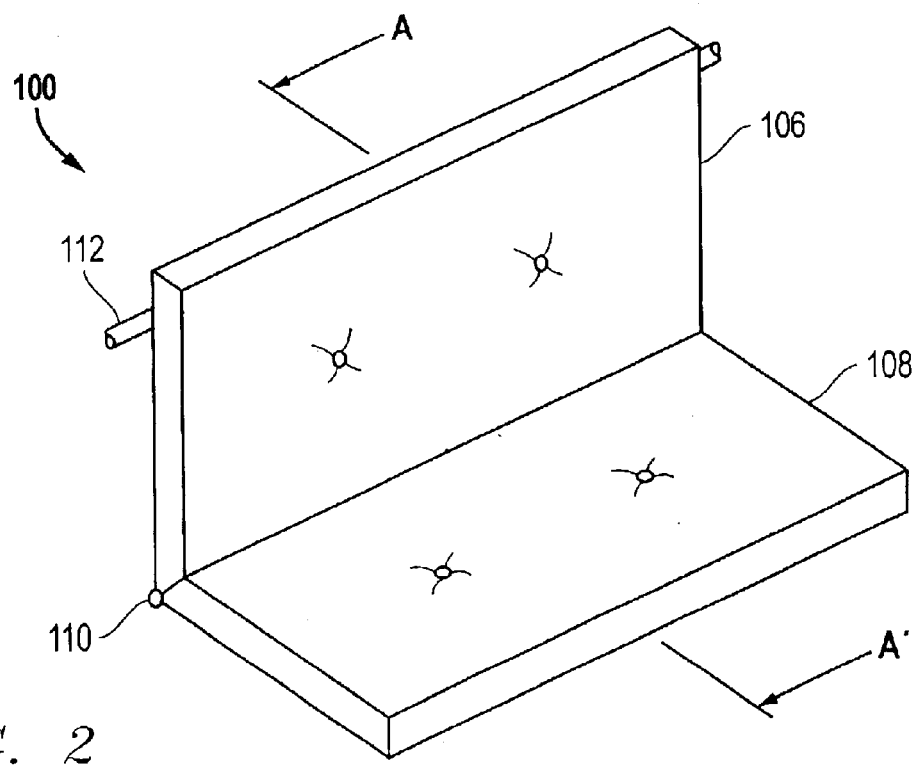
FIG. 2 illustrates a perspective view of a tailgate seat assembly, according to certain embodiments of the invention.

Referring to FIG. 2, the system 100 includes the back 106 and the seat 108. The back 106 is connected to the seat 108 by the hinge 110. The hinge 110, for example, extends along an edge and length of the back 106 and the seat 108. The hinge 110, as so connected to the back 106 and the seat 108, permits the back 106 to pivot, lengthwise, with respect to seat 108. Each of the back 106 and the seat 108 can be substantially rigid, and can include seating materials for comfort, e.g., cushioning, upholstery, and so forth. The back 106 is further supported in upright position with respect to the substantially horizontally positioned seat 108, via the pole 112. The pole 112 is substantially rigidly fixed, for example, as hereinafter discussed regarding the bed 114 of the pickup truck 104, to maintain the back 106 fixed in the upright relation with the seat 108.

Figure 3:
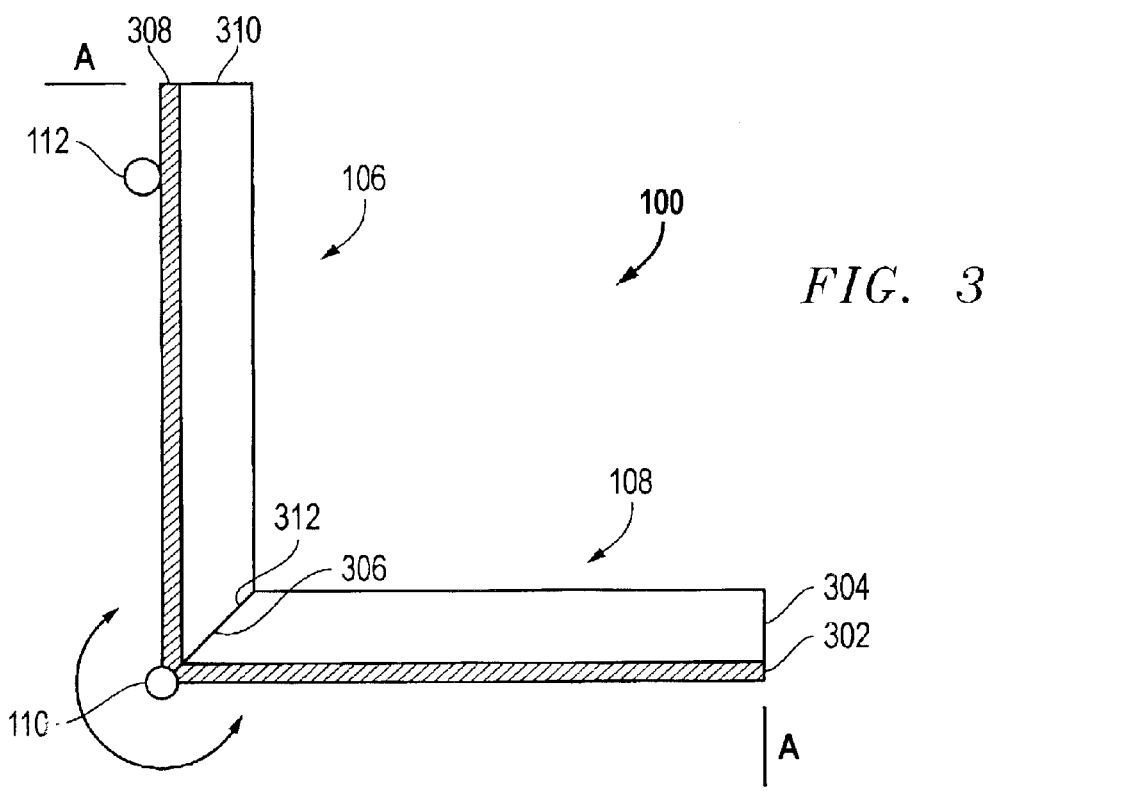
FIG. 3 illustrates a cross-section of the tailgate seat assembly of FIG. 2, taken along line A–A' of FIG. 2, wherein a back of the assembly is in an L-shaped position with respect to a seat of the assembly, such as during use of the assembly for seating, according to certain embodiments of the invention.

Referring to FIG. 3, in conjunction with FIG. 2, a cross-section along lines A–A' of FIG. 2 of the system 100 shows the back 106 and the seat 108 positioned as shown in FIG. 2. The seat 108 includes a rigid panel 302. The rigid panel 302 is, for example, a wood, metal, hard plastic or other material sufficient to support persons sitting on the seat 108. As shown in FIG. 1, the seat 108, in use with the tailgate 102 of the pickup truck 104, lays atop the tailgate 102 and in such position forms a bottom of a seat. The rigid panel 302 provides adequate support as such bottom.

Affixed to or otherwise located along a surface of the rigid panel 302 is a cushion 304. The cushion 304 is, for example, foam rubber, fill materials, blanketing or other similar seat materials intended for cushioning and comfort of the seat 108. The cushion 304 is attached or affixed to the panel 302 by glue, staple, rivet or other securement. Alternatively, the cushion 304 can be easily removable from the panel 302, as desired for the application. The cushion 304 includes a bevel 306 at an edge of the cushion 304 adjacent the hinge 110 affixed to the seat 108. The bevel 306 (in cooperation with a similar configuration of the back 106, as later described) better enables the positioning of the back 106 and the seat 108 in relative relation as shown in FIGS. 1–3.

Although not shown in detail in FIG. 3, the cushion 304, the panel 302, or both (i.e., when the cushion 304 is positioned adjacent the surface of the rigid panel 302) can be covered by upholstery, fabric, plastic, leather or other covering typical or otherwise useable and desired for seating of the type described. In any event, any such covering of the seat 108 does not inhibit or adversely affect operation of the hinge 110, coupled with the seat 108 and the back 106, to permit free pivoting of the seat 108 along the hinge.

The hinge 108, as previously described, is fixedly attached to the rigid panel 302, for example, by screws, nails, or other typical fixed connectors. The hinge 108 can be any of a wide variety of hinging elements, sufficient to permit the back 106 and the seat 108 to be fixed in pivoting relation along an edge of each. The hinge 108 can extend along the entirety of an edge of each of the back 106 and the seat 108 (such as generally shown in the Figures) or can be any other combination or multiple of individual and separate hinging elements that fix the back 106 and the seat 108 in hinged and pivotal relationship. The hinge 108, in every event, should permit the back 106 and the seat 108 to be positioned in the relationship of FIGS. 1–3, i.e., wherein the back 106 is upright with respect to the horizontally located seat 108.

The back 106 of the system 100 includes a rigid sheet 308 and a cushioned pad 310. The rigid sheet 308 can be the same as or similar to the panel 302 of the seat 108. Alternatively, the rigid sheet 308 can be any of a wide variety of materials sufficient to support persons leaning against the back 106. As shown in FIG. 1, the back 106, in use with the tailgate 102 of the pickup truck 104, is positioned upright with respect to the tailgate 102 and in such position forms a back support member a seat. The rigid sheet 308 in any event provides adequate support as such back support member of the seat.

The cushioned pad 310 of the back 106 can also be the same as or similar to the cushion 302 of the seat 108. For example, the pad 310 can be foam rubber, fill materials, blanketing or other similar back materials intended for cushioning and comfort of the back 106. The cushioned pad 310 is attached or affixed to the sheet 308 by glue, staple, rivet or other securement. Alternatively, the cushioned pad 310 can be easily removable from the sheet 308. As with the cushion 304 of the seat 108, the cushioned pad 310 includes a bevel 312 at an edge of the pad 310 adjacent the hinge 110 at the back 106. The bevel 312 cooperates with the bevel 306 to permit the back 106 to be rotated, at the hinge 110, toward the seat 108, in order to form an upright back 106 and horizontal seat 108 arrangement, such as shown in FIGS. 1–3.

The hinge 110 is attached along an edge of the sheet 308, to permit the back 106 to pivot in relation to the seat 108 (as generally shown by arcular arrow B in FIG. 3). Attachment of the hinge 110 to the sheet 308 is substantially the same as possible for the seat 108.

Although not shown in detail in FIG. 3, the back 106, similarly to the seat 108, can be covered by upholstery, fabric, plastic, leather or other covering typical or otherwise useable and desired for seating of the type described. Any such covering of the back 106 permits effective operation of the hinge 110, as coupled with the seat 108 and the back 106.

The back 106 is supported in upright relation to the seat 108 via the pole 112. As later described, the pole 112 is, for example, positioned across the bed 114 of the pickup truck. The pole 112 is fixedly so positioned in various manner, and is in every event sufficiently fixed to support the back 106 whenever persons or other loads are placed against the back 106 when the system 100 is in use as a tailgate seat.

Figure 4:
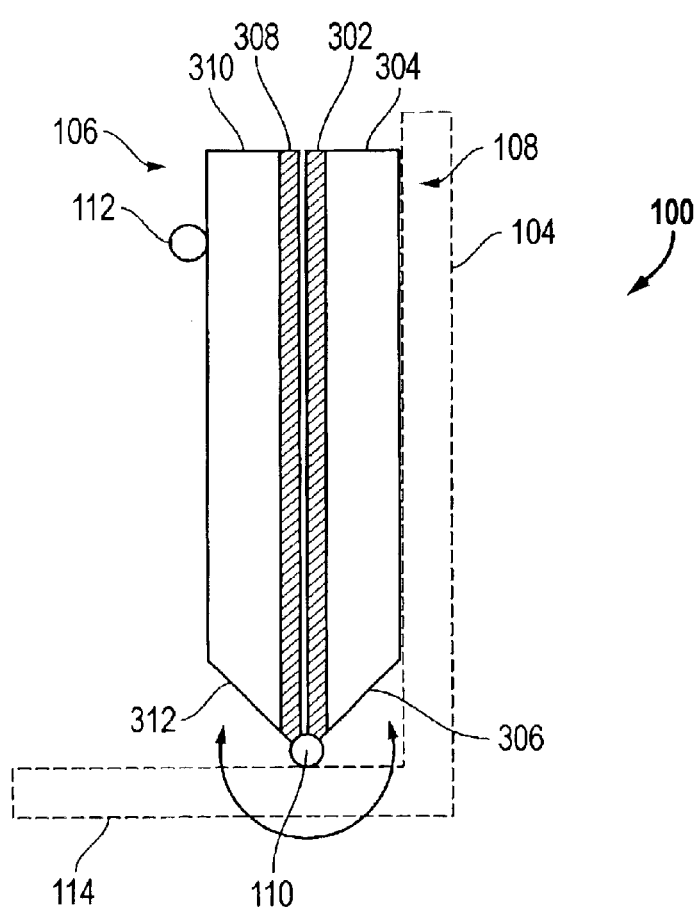
FIG. 4 illustrates a cross-section of the tailgate seat assembly of FIG. 2, taken along line A–A' of FIG. 2, wherein a back of the assembly is in a U-shaped position with respect to a seat of the assembly, such as during storage of the assembly in a pickup bed, according to certain embodiments of the invention.

Referring to FIG. 4, in conjunction with FIG. 2, the same cross-section along lines A–A' is shown with different rotational relation of the back 106 and the seat 108. In FIG. 4, the back 106 and the seat 108 are folded along the hinge 110, until the rigid panel 302 of the seat 108 and the rigid sheet 308 of the back 106 are in adjacent and close relationship. In the arrangement illustrated in FIG. 4, the system 100 is in compacted condition, in that the relationship of the adjacently facing panel 302 and sheet 308 make the entire system 100 relatively flat.

When the folded relationship of the back 106 and the seat 108, along the hinge 110, are as shown in FIG. 4—that is, where the panel 302 and the sheet 308 are adjacently facing when folded at the hinge 110—the width of the system (as seen in cross-section in FIG. 4) is minimal. For example, depending on the thickness of the panel 302, the sheet 308, the pad 310, and the cushion 304, the system can have thickness on the order of from about an inch to a couple of inches (e.g., on the order of about 3–4", more or less). As so folded the system width (in cross-section) is minimal. For storage or otherwise when not in use, for example, the folded system 100 can be located along the bed of a pickup truck. In the particular example shown in FIG. 4, for instance, the folded system 100 is propped upright along an edge of the bed, such as upright towards the edge of the bed near the truck cab or upright along the closed tailgate. In such upright location, the folded system 100 is secured in the location and position via the pole 112. The pole 112 can extend across the length of the panel 304 or sheet 310, as applicable, facing outwardly from the bed edge. The pole 112 is secured in this position by features of the pole 112 and/or the pickup bed, as hereafter further discussed, such as via holes for selectively locating the pole at its ends or by retaining spring or similar force of the pole 112 where the pole 112 has jambing features.

Figure 5:
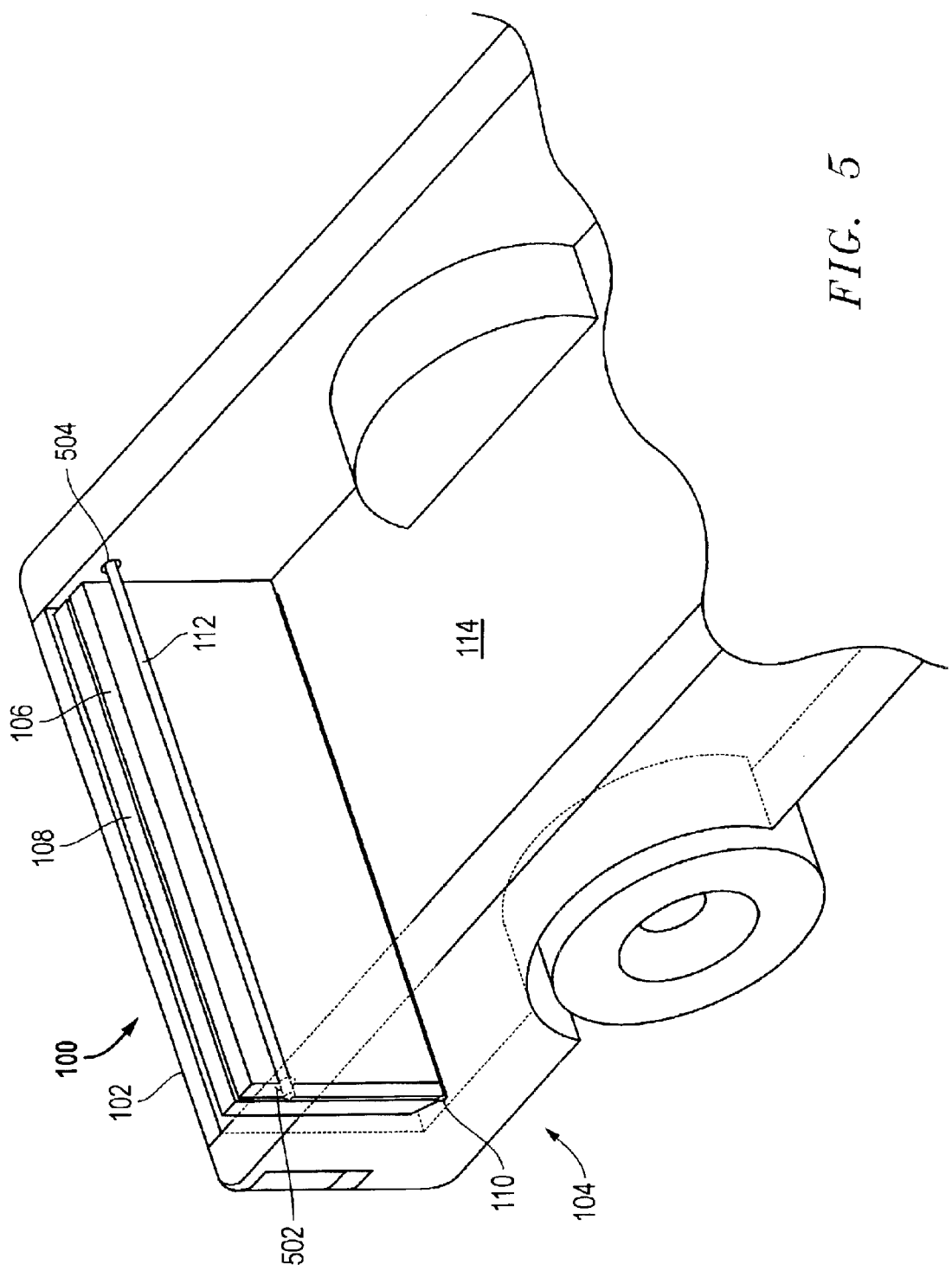
FIG. 5 illustrates a perspective view of a tailgate seat assembly, in place at a tailgate of a truck bed when being stowed in the bed, according to certain embodiments of the invention.

Referring to FIG. 5, in conjunction with FIG. 1, the bed 114 and tailgate 102 of the pickup truck 104 of FIG. 1 are shown with the stored and folded system 100. The bed 114 of the truck 104 includes respective holes 502, 504 along a side of the bed 114. The holes 502, 504 permit placement of respective ends of the pole 112 within the holes 502, 504. The holes 502, 504 are located and spaced, in the exemplary arrangement, along sides of the bed 114 in the vicinity of the tailgate 102. The pole 112 (as located in the holes 502, 504 or as otherwise so positioned) provides support along the back 106 (or, alternatively, the seat 108, if an opposite orientation of the arrangement is employed) in the folded system 100. The support along the back 106 (or the seat 108, as the case may be) maintains the folded system 100 in place as shown in FIG. 5. In the stored and folded system 100, the system 100 is maintained from shifting or other extensive movement during transport and so forth.

Although not detailed in the Figures, the pole 112 can, as an alternative to position in the holes 502, 504, be equipped with jambing capability. For example, conventionally available accessories for trucks include pole type members that can be effectively lodged between sides of a bed of a truck. These type members are typically employed for retaining transported equipment and the like in the bed of the truck, and prevent excessive shifting and the like of the bed contents. The conventionally available pole type members, for example, provide spring, screw or other jamb-type positioning of the pole in rigid and supporting manner in order to maintain the folded system 100 in place. Of course, if the holes 502, 504 are not required for locating the pole 112, either because the pole 112 has jamb capability or otherwise, then permanent holes or other added securement means for the pole 112 are not necessary. In any event, the pole 112, however located and secured with the bed 114, serves for supporting the folded system 100 substantially as shown.

Figure 6:
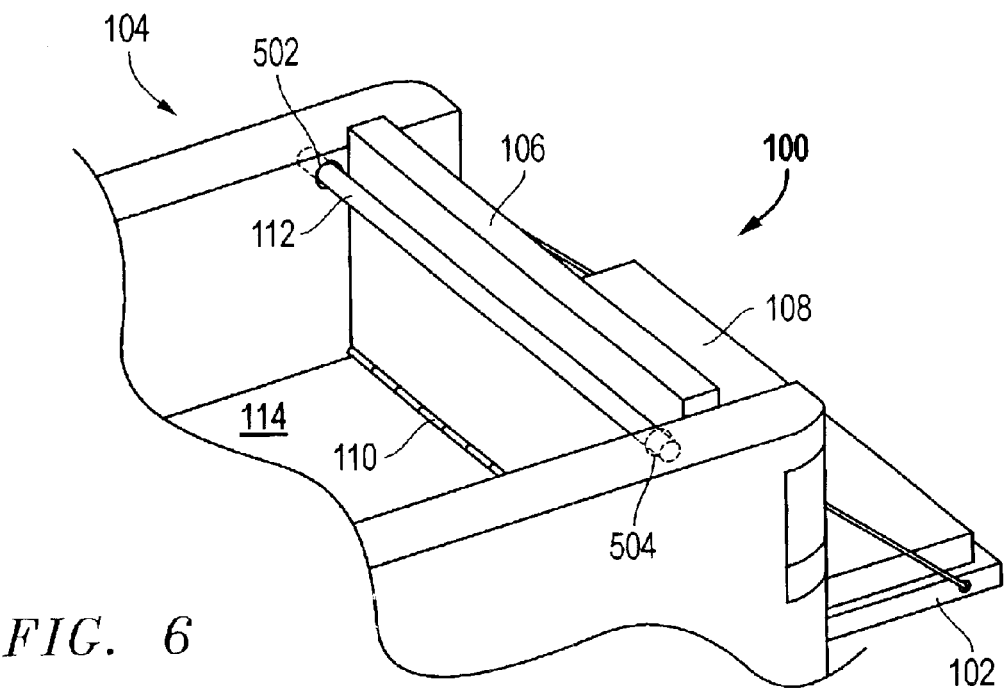
FIG. 6 illustrates a perspective view of a tailgate seat assembly, forming a tailgate seat on a tailgate of a truck bed shown in partial view, according to certain embodiments of the invention.

Referring to FIG. 6, the system 100 is shown in use according to the configuration for the pole 112 of FIG. 5. In the configuration, the pole 112 is positioned with respective ends in the holes 502, 504 on either side of the bed 114 of the pickup truck 104. As so positioned, the pole 112 supports the back 106. The seat 108 is positioned with respect to the back 106, so that the back 106 is upright against the pole 112 and the seat 108 lays atop the tailgate 102 (in down or open position). It is notable that the back 106 and the seat 108 pivot on the hinge 110, attached to both the back 106 and the seat 108. Where the thicknesses of the back 106 or the seat 108, or both, are such that the system 100 can fold only in one manner, the pivot to achieve the particular relationship of the back 106 and the seat 108 in FIG. 6 is an opposite pivot. In every event, the hinge 110 permits the back 106 and the seat 108 to change in relative position and to form a tailgate seat and also to be folded for storage.

Although not shown in detail in the Figures, the back 106 can, but need not necessarily, include additional elements in order to fix the back 106 with the pole 112 or otherwise, to provide further rigidity to the tailgate seat in use. Moreover, although also not shown in detail in the Figures, the seat 108 can, but need not necessarily, include additional parts to substantially fix the seat 108 with respect to the tailgate 102. The additional elements or parts can be any of a wide variety of common devices, for example, snaps, latches, hooks, Velcro™, or other possibilities. The purpose of the additional elements or parts, in any event, is to further support and maintain the positioning of the back 106 relative to the seat 108 and the entire system 100 with respect to the truck 104, particularly the bed 114 and the tailgate 102.

In operation, the system 100 forms a tailgate seat or similar feature. Because the back 106 and/or the seat 108 can include cushioning, padding, upholstery, and the like, the system 100 provides a convenient and comfortable accessory. In use, the system 100 forms the tailgate seat sufficiently for one or more persons to sit in normal manner at the truck's tailgate location.

As previously discussed, when the system 100 is not in use as the tailgate seat, the system 100 is folded and located compactly adjacent the tailgate or otherwise within the bed of the pickup. Where the pole 112 is placed in the holes 502, 504 for support, the holes 502, 504 can be positioned in the bed 114 in such manner as to serve to support the pole 112 both for the purposes illustrated in FIG. 5 and FIG. 6. That is, the pole 112 can be located to provide support of the back 106 when in use and also to support the entire folded system 100 when stored and not in use as a seat. Of course, if the holes 502, 504 are not required because the pole 112 serves inherently for the required support (such as, for example, because of jamb capabilities or otherwise), then the holes 502, 504 need not be formed in the bed 114 in the manner shown. Also, if holes are not required because of the pole 112 operations, the storage options for the folded system 100 may be multiplied. For example, the folded system 100 could easily be stored and maintained within the bed in similar manner but along portions of the bed adjacent the truck cab. Numerous options and alternatives are possible in all cases.

Figure 7:
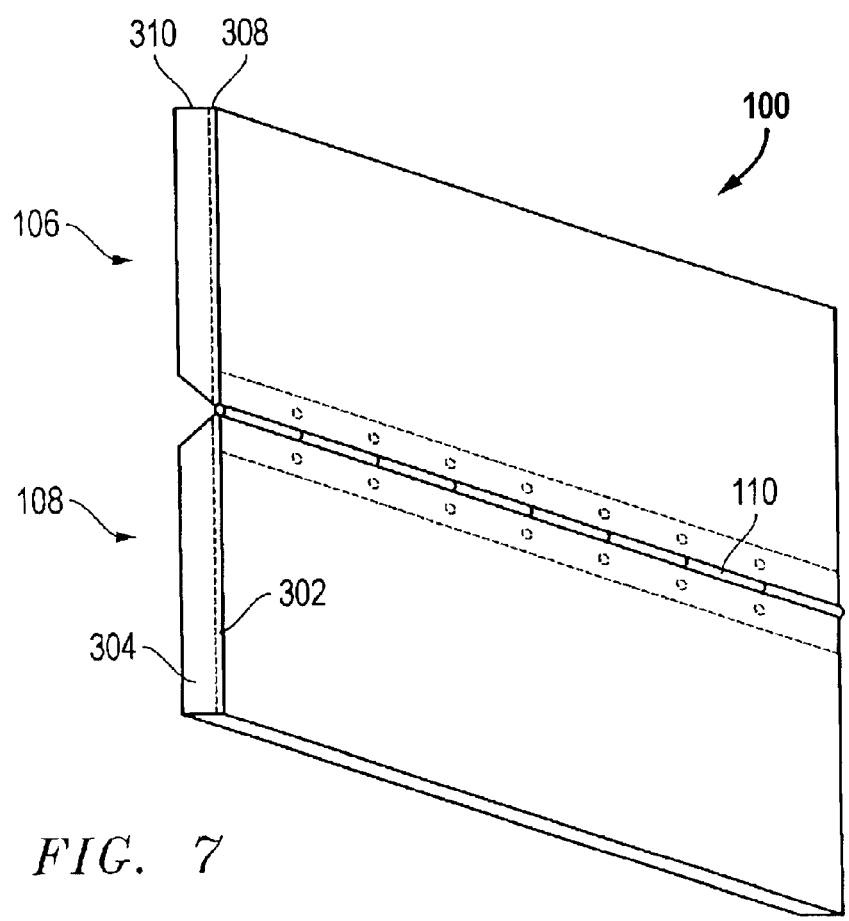
FIG. 7 illustrates a perspective view of the tailgate assembly of FIG. 2, wherein the back of the assembly and the seat of the assembly form a substantial plane, such as during use of the assembly as a cushioned mattress, according to certain embodiments of the invention.

Referring to FIG. 7, the back 108 and the seat 106 are positioned in pivot along the hinge 110 to provide a relatively flat configuration. In this or similar configuration, the system 100 can be used within the bed of the truck or otherwise, even without simultaneous use of the pole 112 for support. The flattened configuration can provide a cushioned extent of the bottom of the pickup bed, for example. Alternatively, the flattened configuration can be used externally to the pickup bed. An exemplary use of the flattened configuration of the system 100 is a bed in camping or the like.

A potential benefit of the tailgate seat provided via the system 100 is in picnics, tailgate parties, event seating, and similar situations. It is believed that these and similar uses can provide branding and display opportunities. The back 108 and/or the seat 106, for example, can be prepared with a label or insignia. A particular example of the arrangement includes on the back 108, at the cushioned surface, a display of a team emblem or the like. For tailgate parties and similar events, the system 100 then can simultaneously provide use as a comfortable and convenient tailgate seat and provide a desired display when persons are not seated at the tailgate seat. Numerous other possibilities for display and use are possible and all are included for purposes of this description.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system, comprising:
   a seat;
   a back;
   a hinge connecting the seat and the back;
   a support for the back, comprising a removable pole;
   wherein the system provides a cushioned and convenient tailgate seat in a pickup truck; and
   wherein the pole is rigidly supportable along the back for resting of the back against the pole.

2. The system of claim 1, wherein the seat and the back can be pivoted via the hinge to position the back adjacent the seat.

3. The system of claim 1, wherein the pole is supported in holes of a pickup truck bed.

4. The system of claim 3, wherein the pole is jambed to provide support of the back.

5. The system of claim 4, wherein the seat and the back can be pivoted via the hinge to position the back adjacent the seat; and
   wherein the pole maintains the position of the back adjacent the seat for purposes of storage.

6. A tailgate seat for use with a pickup truck, comprising:
   a back;
   a seat;
   a hinge connecting the seat to the back and permitting the back to freely pivot with respect to the seat, from an L-shaped position to a folded U-shaped position; and a substantially rigidly supported pole extending along the back, but not connected to the back, to maintain the back in resting fixed L-shaped or U-shaped position with respect to the seat.

7. The tailgate seat of claim 6, wherein the back comprises:

a substantially rigid panel; and a cushion affixed atop the rigid panel.

8. The tailgate seat of claim 6, wherein the seat comprises:

a substantially rigid panel; and a cushion affixed atop the rigid panel.

9. The tailgate seat of claim 7, wherein the seat comprises:

a substantially rigid second panel; and a second cushion affixed atop the second panel.

10. A method of forming a tailgate seat, comprising the steps of:

providing a back;

providing a seat;

pivoting the back with respect to the seat;

supporting the back via a pole located laterally across a tailgate, wherein the back rests against the pole and is not fixed to the pole.

11. The method of claim 10, further comprising the step of:

locating the seat atop a tailgate to obtain an L-shaped configuration of the back and the seat.

12. The method of claim 11, further comprising displaying a design on the back.

* * * * *